Sept. 27, 1966 TOSHIHIRO KUNIHIRO ET AL 3,275,749
TWO-STAGE MULTIPLEX SWITCHING SYSTEM EMPLOYING INTERLACED
CONNECTIONS BETWEEN HIGHWAYS AND EXTERNAL CIRCUIT GROUPS
Filed Oct. 8, 1965 6 Sheets-Sheet 1

INVENTORS
TOSHIHIRO KUNIHIRO
NOBUHIKO SHIMASAKI
BY

OSTROLENK, FABER, GERB & SOFFEN
ATTORNEYS

Sept. 27, 1966 TOSHIHIRO KUNIHIRO ET AL 3,275,749

TWO-STAGE MULTIPLEX SWITCHING SYSTEM EMPLOYING INTERLACED CONNECTIONS BETWEEN HIGHWAYS AND EXTERNAL CIRCUIT GROUPS

Filed Oct. 8, 1965 6 Sheets-Sheet 2

INVENTORS
TOSHIHIRO KUNIHIRO
NOBUHIKO SHIMASAKI
BY
OSTROLENK, FABER, GERB & SOFFEN
ATTORNEYS

INVENTORS
TOSHIHIRO KUNIHIRO
NOBUHIKO SHIMASAKI
BY
OSTROLENK, FABER, GERB & SOFFEN
ATTORNEYS

Sept. 27, 1966 TOSHIHIRO KUNIHIRO ET AL 3,275,749

TWO-STAGE MULTIPLEX SWITCHING SYSTEM EMPLOYING INTERLACED CONNECTIONS BETWEEN HIGHWAYS AND EXTERNAL CIRCUIT GROUPS

Filed Oct. 8, 1965 6 Sheets-Sheet 6

INVENTORS
TOSHIHIRO KUNIHIRO
NOBUHIKO SHIMASAKI
BY
OSTROLENK, FABER, GERB & SOFFEN
ATTORNEYS 3,275,749
TWO-STAGE MULTIPLEX SWITCHING SYSTEM EMPLOYING INTERLACED CONNECTIONS BETWEEN HIGHWAYS AND EXTERNAL CIRCUIT GROUPS

Toshihiro Kunihiro and Nobuhiko Shimasaki, Shiba, Minatoku, Tokyo, Japan, assignors to Nippon Electric Company Limited, Tokyo, Japan, a corporation of Japan Filed Oct. 8, 1965, Ser. No. 494,221
Claims priority, application Japan, Oct. 14, 1961, 36/37,202
6 Claims. (Cl. 179—15)

This invention relates to switching systems and more particularly to a novel arrangement for two-stage multiplex switching systems which is adapted to provide a plurality of alternate paths for message transmission so as to overcome blocking due to troubled lines and which is further adapted to perform these functions without the necessity for adding duplicate equipment to perform such functions, and is a continuation-in-part of copending application Serial No. 230,138, filed October 12, 1962, entitled "Two-Stage Multiplex Switching System Employing Interlaced Connections Between Highways and External Circuit Groups."

In multiplex switching systems such as, for example, time-division multiplex switching systems, subscriber lines at remote locations are normally connected to predetermined trunk lines. Interconnections between these trunk lines are affected automatically upon identification of the called subscriber's identifying number so as to appropriately interconnect the called to the calling party. In order that a plurality of subscribers which may be connected to each such trunk line may be afforded continuous service, it is well known to multiplex messages on each trunk line wherein each such subscriber is afforded a specific time slot during which the subscriber's message is carried through the network. In such systems, if the trunk line to which a plurality of subscribers are connected becomes out of order, this situation thereby disables all of the subscribers connected to that trunk line. It is therefore incumbent upon the network to provide some alternate means of service for the affected subscribers in order that service may continue during the time period in which the disabled trunk line is being repaired or replaced.

One manner of carrying this out is to provide an alternate, or standby, trunk line for each existing trunk line in the network which may be automatically substituted into the network in place of the disabled trunk line so that subscriber service may continue throughout the repair or replacement period. As can clearly be seen, such a system requires a substantial duplication of already exitsing equipment producing in effect two identical networks, one being the standby network and the other being the existing network, which is normally employed unless and until some disorder occurs, at which time a trunk line or trunk lines of the standby network may be substituted in place of the disabled trunk lines. While it is necessary to provide some means for maintaining service, in spite of disorders which may occur through operating periods, the above mentioned solution becomes a rather costly one from the viewpoint of equipment expense.

The instant invention overcomes the disadvantages of a single network system having no alternative paths by providing alternative paths which may be employed during times at which a disorder may occur and further, requires substantially no increase in the network size and hardware, to perform these functions. In addition thereto, the system of the instant invention provides a plurality of alternate paths as opposed to a single alternate path which may be employed during a time at which some trunk line has become disabled.

The instant invention is comprised of a two-stage multiplex switching system having a plurality of subscriber groups wherein each subscriber group has a plurality of subscribers within the group which are multiplexed to a trunk line in any suitable fashion, such as, for example, by means of a time-division multiplex arrangemnt. Neighboring subscriber groups are interconnected to a common trunk line forming a closed loop arrangement such that no more than two neighboring subscriber groups have no more than one common trunk line. This arrangement, coupled with the time-division multiplexing control circuitry, acts to provide a plurality of alternative paths through which a message may be transmitted so that upon the occurrence of a disorder in any trunk line of the system, any one of the alternative paths may be selected so as to route messages being transmitted without the necessity for waiting until the disabled line is placed back into service.

In order to provide still more flexibility, the time-division multiplx switching systems, which interconnect trunk lines of each group, are arranged so as to provide interconnections within line groups (wherein each trunk line group has a plurality of individual trunk lines comprising the group) in the switching network so as to provide a greater variety of alternate paths through which messages may be routed if any of the existing lines become disabled.

It is therefore one object of this invention to provide a multiplex switching system having a novel arrangement for providing alternative message routes which may be employed if a preferred route is disabled for any reason.

Another object of this invention is to provide a multiplex switching system which is adapted to transmit subscriber messages through alternate routes due to the disabling of a preferred route wherein connections are provided for each subscriber group to share a common trunk line with a neighboring group.

Still another object of this invention is to provide a multiplex switching system having switching arrangements for interconnecting trunk lines in such a manner as to have neighboring trunk lines share a common trunk line for the provision of alternative message groups.

These and other objects of the invention will become apparent when reading the accompanying description and drawings in which.

Figures 2, 5, 6, 8:
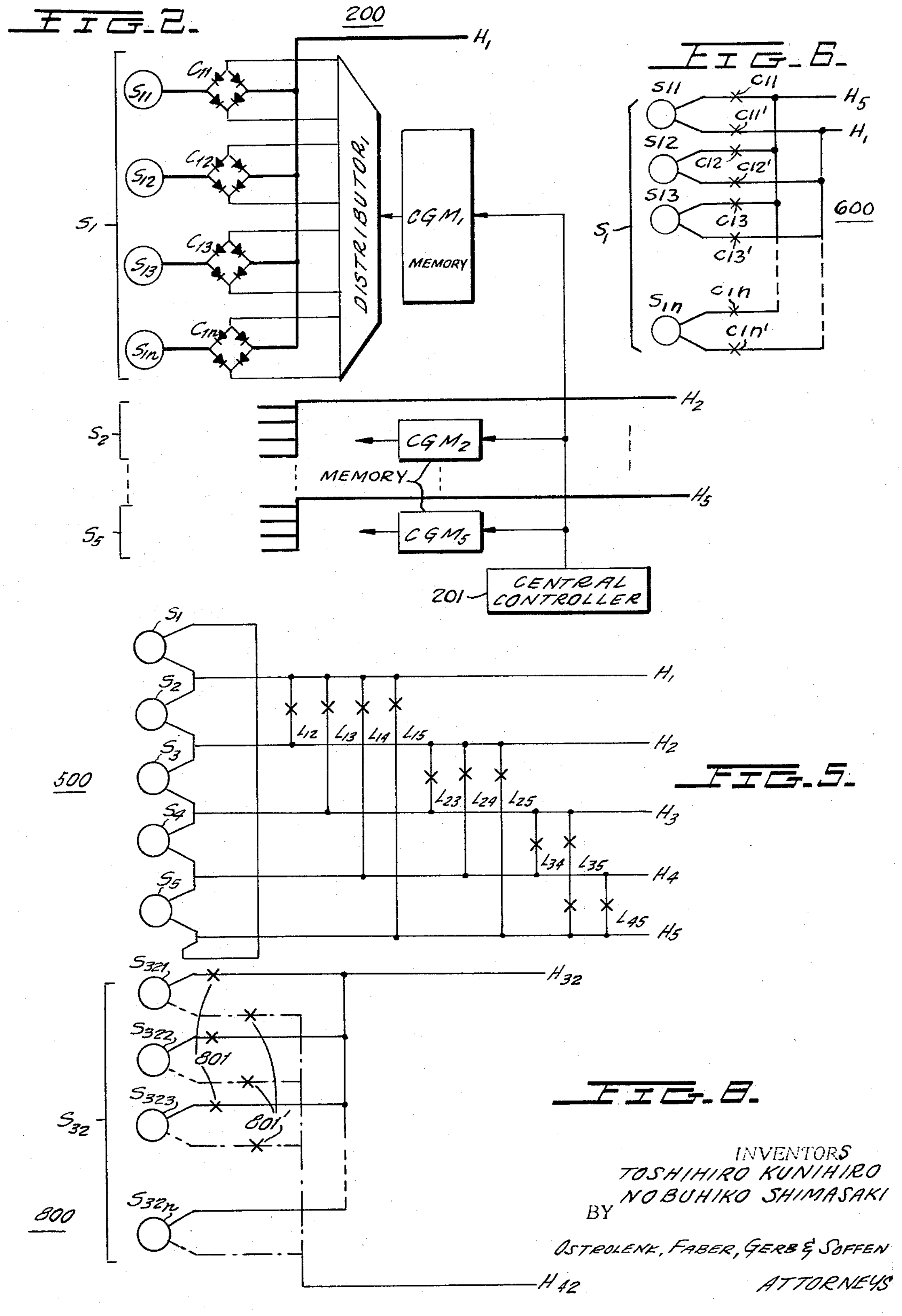
FIGURE 2 is a schematic block diagram showing a portion of the network of FIGURE 1 in greater detail.
FIGURE 5 is a trunking block diagram of a two-stage time-division multiplex switching system designed in accordance with the principles of the instant invention.

FIGURES 6, *6a* and *6b* show a portion of the subscriber network of the system of FIGURE 5 in greater detail.

Figure 7:
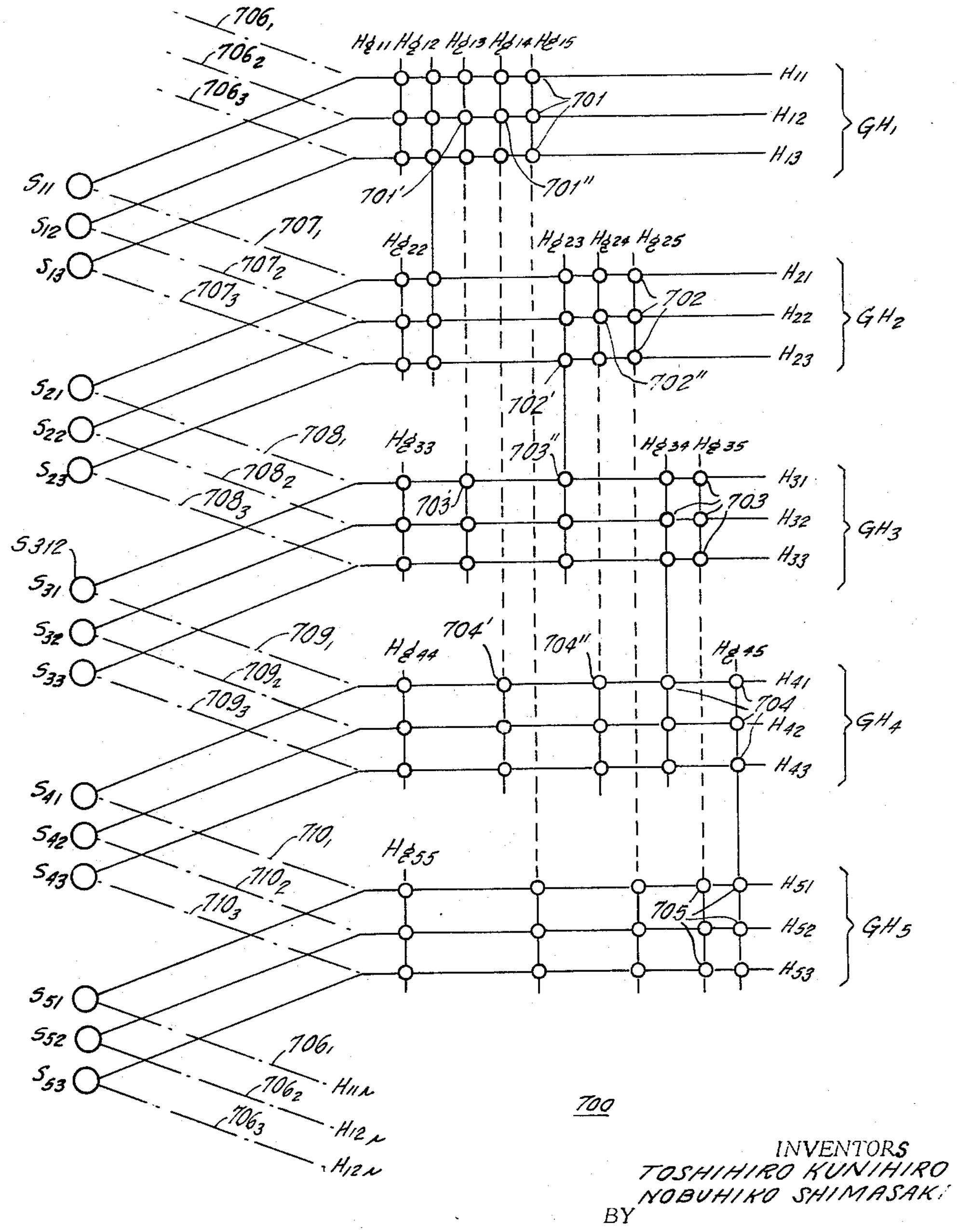

FIGURE 7 is a trunking block diagram of a three-stage multiplex switching network designed in accordance with the principles of the present invention.

FIGURE 8 is a block diagram showing a portion of the subscriber circuit of one subscriber group of FIGURE 7 in greater detail.

Among the many advantages of multiplex switching systems, one salient feature is that of the reduction in the ıumber of physical elements required in the multiplex ar-:angement, as compared with a space-division switching ıetwork, such that the multiplex arrangement is effected ›y multiplexing switches contained within a switching net-vork on a time-division, or a frequency-division basis. ⁼IGURE 1 shows one such time-division switching system l00 which comprises five time-division common busses hereandafter referred to as highways), $H_1$, $H_2$, $H_3$, $H_4$, ınd $H_5$ and five subscriber and/or trunk groups (here-nafter referred to as subscriber groups), $S_1$–$S_5$ wherein he subscripts for the subscriber groups S conform respec-ively to those subscripts for the highways H. Between ıny two highways, an interconnecting link, such as the inks $L_{12}$, $L_{13}$ . . . $L_{23}$, $L_{24}$ . . . $L_{45}$ containing a set of ime-division contacts such as the contacts 101–104 is ›rovided. These interconnecting links L are used for the ime-divisional connection of calls between subscribers vhich pass through two different highways H, and con-rolled by cyclic memories (not shown). FIGURE 2 hows a circuit diagram 200 illustrating more detailed onnections between the individual subscribers of sub-criber group $S_1$ and the highway $H_1$ of FIGURE 1. In-ividual subscribers $S_{11}$, $S_{12}$ . . . $S_{1n}$ of the $S_1$ subscriber roup are connected to a common highway $H_1$ through me-division switches $C_{11}$, $C_{12}$, . . . $C_{1n}$, respectively. 'hese switches may, for example, be well-known "diode uads" which are controlled by a distributor Distributor, 'hich is in turn controlled by a C switch gating memory 'GM. CGM is a cyclic memory for storing the address ıformation of the time-division switches C which are › be gated at the specified time slot. The number of ıe words stored in the cyclic memory CGM is equal to ıe number of time slots which will be explained later. he address information is fed into the Distributor 'hich decodes the information and gates the addressed vitch for each time slot. The central control can hange the contents of any time slot of any CGM. It ıould be understood that each of the remaining sub-:riber groups $S_2$–$S_5$ shown in FIGURE 1, in a like man-er, are comprised of a plurality of individual subscribers 'hich are connected by multiplexing switches to one com-ıon highway in a manner similar to that shown for the ıbscriber group $S_1$ of FIGURE 2.

Figure 1:
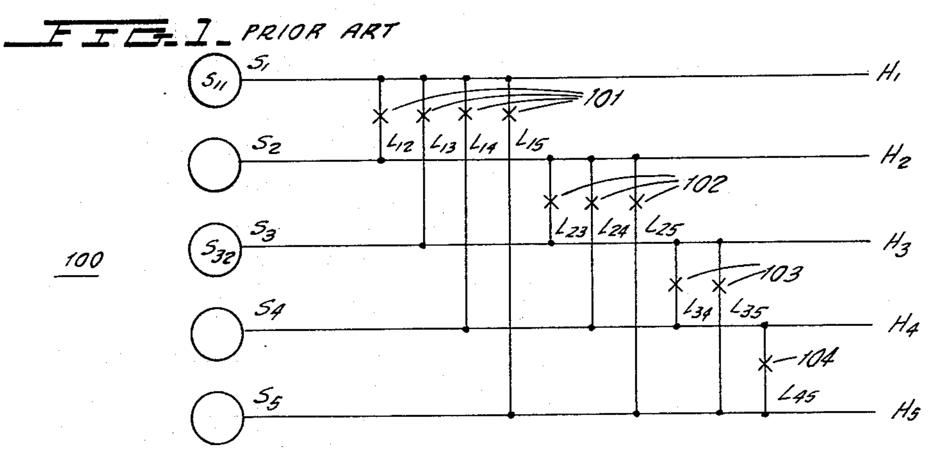
FIG. 1 PRIOR ART
FIGURE 1 is a schematic trunking block diagram of a conventional two-stage time division multiplex switching network.

Referring to FIGURES 1 and 2, let it be assumed that connection is to be made between subscriber $S_{11}$ in the ıbscriber group $S_1$ and subscriber $S_{32}$ in subscriber group ₃. In order that this interconnection be completed, it is ecessary that all time-division switches contained in the oute $S_{11}$, $C_{11}$, $H_1$, $x$ [$L_{13}$], $H_3$, $C_{32}$ (not shown), $S_{32}$ ($x$ enotes the time-division switch 101 in interconnecting ık $L_{13}$ between highways $H_1$ and $H_3$), be switched "ON" ıring a short time interval $t$ (hereinafter referred to as time-slot $t_1$) within a constant time period T at which ne all switches in the aforementioned message loop are rned ON (i.e., closed) for an interval $t$ and OFF for the st of period T in a repetitive fashion. It is also possible establish another telephone connection on a route com-ising $H_1$, $H_3$, $L_{13}$ and an inter-highway time-division 'itch 101 by using another time-slot differing in phase om the previously mentioned time-slot $t_1$. Thus, the me amount of simultaneous calls as the maximum ımber of slots N within the time period T can be handled ı these highways and an inter-highway link wherein N equal to $T/t$. This is the reason why multiplex switch-g networks provide the necessary features as shown ›ove.

For clarity and simplicity of the explanation set forth this disclosure, details of the highways $H_i$ (where $i$ is ual to 1–5), the time-division contacts 101–104 and bscriber circuits and trunks $S_{ij}$ are not illustrated in de-l in FIGURE 1. It should be understood, however, ıt in the case of a four-wire system, both highways and ne-division contacts should be duplicated, one for trans-tter side and the other for the receiver side, whereas in › case of a two-wire system, highways and time-division contacts shown in the block diagram correspond respec-tively, to $H_i$ and 101–104. The modulation systems em-ployed may be of various types, such as PAM, PCM, and so forth, and corresponding to these types, various systems exist for subscriber circuits, trunks, highways, time-di-vision contacts and other peripheral accessories. In addi-tion to the above arrangements, there are various other systems available as regarding the time-slot memory de-vices CGM for turning "ON" all such time-division con-tacts employed in the system during an assigned time-slot or their accessories and connection control equipment facilities for example, Distributor and Central Control, as shown in FIGURE 2. The general operations of such time-division switching systems are known to the prior art and for this reason a detailed description is omitted here for the sake of brevity since the invention is specifically concerned with the trunking scheme. The central con-troller 301 is provided with suitable means (not shown) for monitoring all of the subscriber telephone handsets within the system to determine their state (i.e., in use, or not in use) at any given instant and also to determine that time slot which the subscriber's on line may be using at any given instant. One system which may be employed to determine the state of all the telephone subscribers in the system is set forth in detail in copending U.S. appli-cation Serial No. 211,962, entitled "Automatic Telephone Switching System," filed July 24, 1962, and assigned to the assignee of the instant invention. This system basically has the capability of monitoring all subscribers within the system by continuously scanning all of the subscriber lines and providing an indication of the state of each line being sensed, together with an appropriate identifying code for each line, as well as an indication of the time-slot which any given subscriber may be using.

Another system which may be employed for use in determining the state of each subscriber line and the time-slot which on-line subscribers may be utilizing at any given instant is set forth in copending U.S. application Serial No. 441,980, entitled "Variable Sampling Rate Time-Division Telephone Exchange System," filed March 23, 1965, and assigned to the assignee of the instant in-vention. In this application means are provided for op-erating the switching means for connecting the called to the calling subscriber, storing this information in suit-able memory means and means to compare new requests for calls against the lines and time-slots presently in use in order to determine which time-slots and lines are available for establishing connections between parties presently requesting that a call be connected.

The central controller 201 feeds information into the switch gating memories CGM1–CGM5 which is indica-tive of the available time-slot together with an indication of the calling (or called) party which is being designated that particular time-slot. The memory, for example, may be a rotating drum memory with each genetrix con-taining all the available time-slots $t$ within the time period T for the total number of time-slots available is equal to $T \div t$. During a time duration $T-t$ in which the sub-scribed $S_{11}$ is not connected to its called party the Dis-tributor$_1$ does not receive the code identifying sub-scriber $S_{11}$ and its allocated time-slot and impresses a large voltage across the terminals 206 and 207 with termi-nal 207 being positive relative to terminal 206. The polarity of the diodes 202–205 effectively establishes a short-circuit between these terminals, preventing $S_{11}$ from being connected to highway $H_1$. During the time-slot in which $S_{11}$ is to be connected to highway $H_1$ this voltage is removed, permitting $S_{11}$ to be coupled to highway $H_1$. In a like manner, the cyclic memory $CGM_3$ (not shown in FIGURE 2) operates to couple subscriber $S_{32}$ (not shown in FIGURE 2) to its highway $H_3$ in order to cou-ple the subscribers to their respective highways. In a like manner, another cyclic memory and distributor means (not shown in FIGURE 2) is provided for the purpose of coupling the Highways $H_1$ and $H_3$ to complete the connection between subscribers $S_{11}$ and $S_{32}$. This arrangement may take the form of a cyclic memory $HGM_1$ which operates a distributor to control a diode quad arrangement for coupling highway $H_1$ to $H_2$, in the manner shown in FIGURE 2, wherein the cyclic memory $HGM_1$ is also under control of the central controller 201. A similar cyclic memory and distributor is provided for connecting each of the other highways to one another with the number of cyclic memories $HGM_1$ and their associated distributors being equal in number to the highway connections made. For example, considering FIGURE 1 which teaches the use of five highways for five subscriber groups, the total number of combinations of connections between highways is ten and hence ten cyclical memories and associated distributors would be required to establish the necessary highway interconnections.

Referring again to the network of FIGURE 1, it will be understood that the number of subscribers, or that of trunks in the $S_i$ group (*i* being any number 1–5) which belong to a highway, may be any predetermined number, such as 100 or 1000, which depend upon the number of time slots available in the time period T on the associated highway $H_i$ and the amount of traffic. Upon the occurrence of a disorder in any highway or in any common circuitry in a subscriber group the highway becomes inoperative. The manner in which a system copes with such a situation becomes invariably a problem of how to establish a countermeasure in a system as illustrated in which a subscriber group is assigned to a single highway equipment facility. This is the reason why many systems have gone to the provision of at least one standby unit which may be one which operates in parallel with the operational unit at all times or may be one which operates only in the case of occurrence of a disorder, in order to prevent the termination of operation of subscriber units in subscriber groups from developing into a critical problem in the entire system or in a comparatively large portion of the entire system.

One common method that has been employed in the past and has been reduced to practice for meeting the situation of a disablement in the system, consists in the duplication of all highway components and common circuitry in each subscriber group. In such a case, all time-division contacts, such as the contacts 101–104, switch $C_{ij}$ connecting subscribers $S_{ij}$ to highways $H_i$ and time-slot storing devices $CGM_i$, and so forth, will have to be duplicated.

Figure 3:
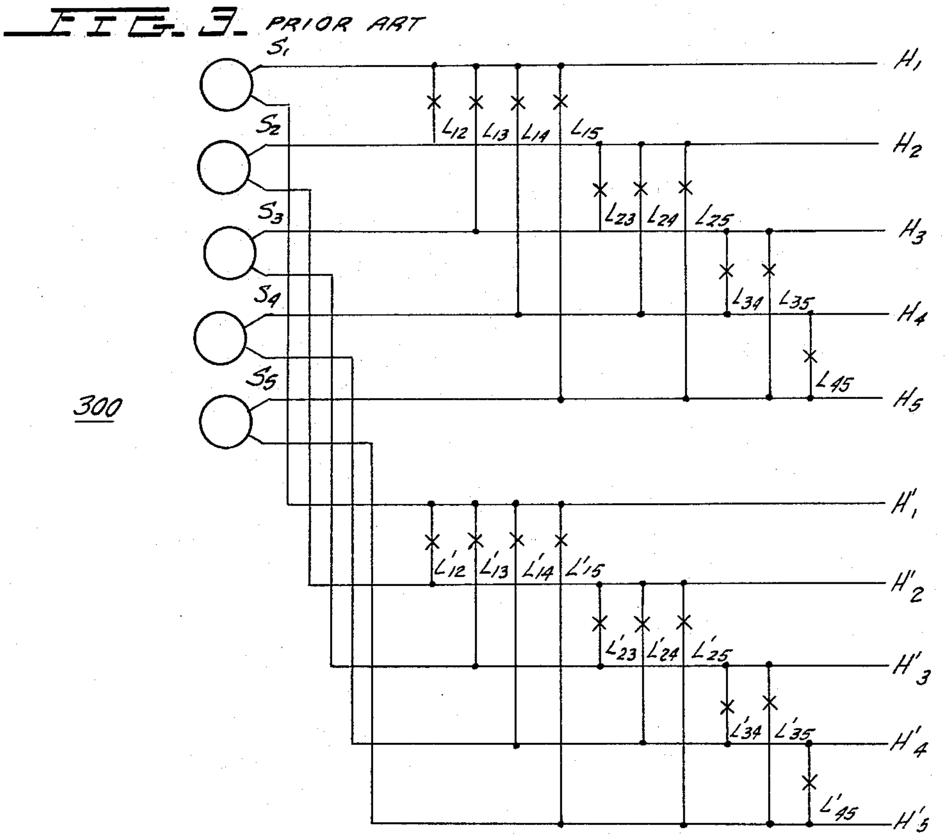
FIG. 3 PRIOR ART
FIGURE 3 is a schematic trunking block diagram of a conventional duplicated two-stage time-division multiplex switching network.
Figure 4:
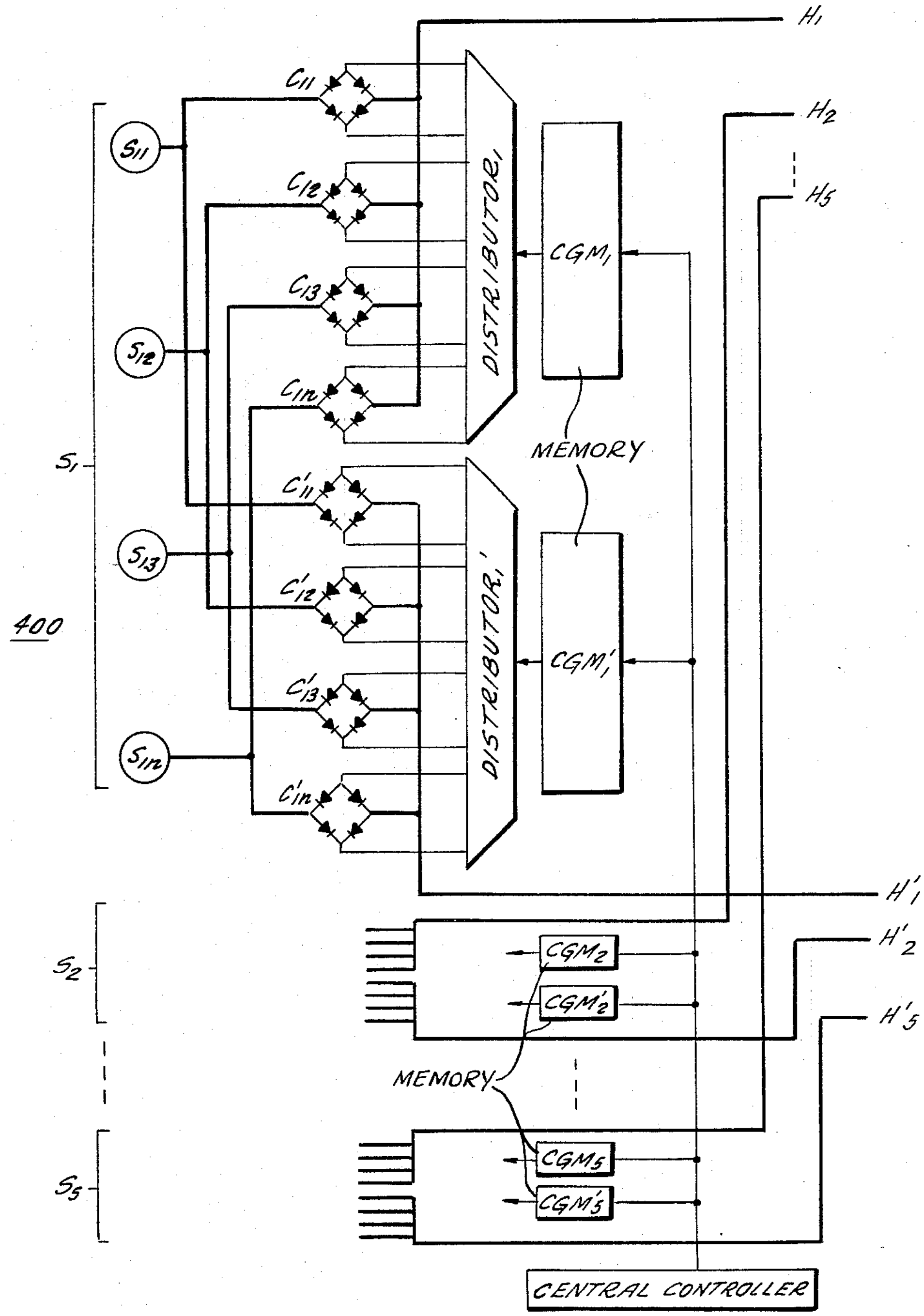
FIGURE 4 is a block diagram showing a portion of the subscriber network of the system of FIGURE 3 in greater detail.
Figure 5A:
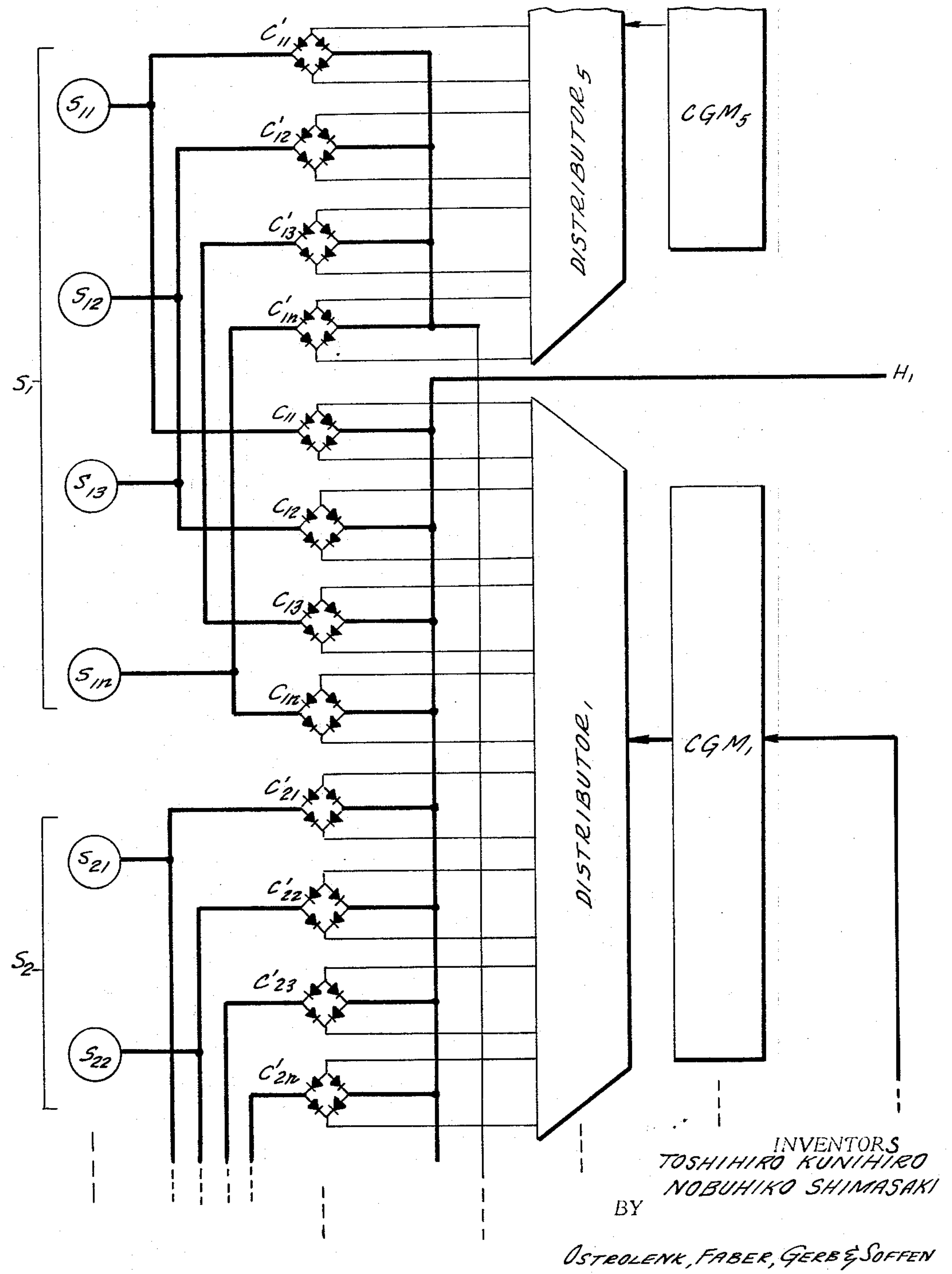

Such an arrangement is illustrated by the system 300 of FIGURE 3. As illustrated therein, each subscriber circuit, or each trunk, corresponds to two independent time-division switching networks through two different sets of time-division contacts. FIGURE 4 illustrates a portion 400 of the network showing the detailed connections between the subscribers $S_{ij}$ and the operational and alternate highways $H_3$ and $H_1'$, respectively. It can therefore be seen from FIGURE 3 that the system 300 is comprised of a purality of subscriber groups $S_1$–$S_5$ and each subscriber group is provided with an operational and a duplicate, or alternate highway $H_1$–$H_5$ and $H_1'$–$H_5'$, respectively. This arrangement enables each such subscriber group, if one of its highways or common circuitry in the subscriber group becomes inoperative, to avail itself of the alternate highway, which is identified by the primed group. The subscriber group 400 for $S_1$ shown in FIGURE 4, shows the interconnections between each individual subscriber $S_{11}$–$S_{1n}$ to the operational and alternate highways $H_1$ and $H_1'$ by means of $C_{11}$ to $C_{1n}$, and $C_{11}$ to $C_{1n}$, or CGM and CGM' or Distributor to Distributor'. It can therefore be seen that double the number of components are required in order to provide the protection necessary to prevent network down-time due to a disablement of any highways H within the network 300.

Figure 6B:
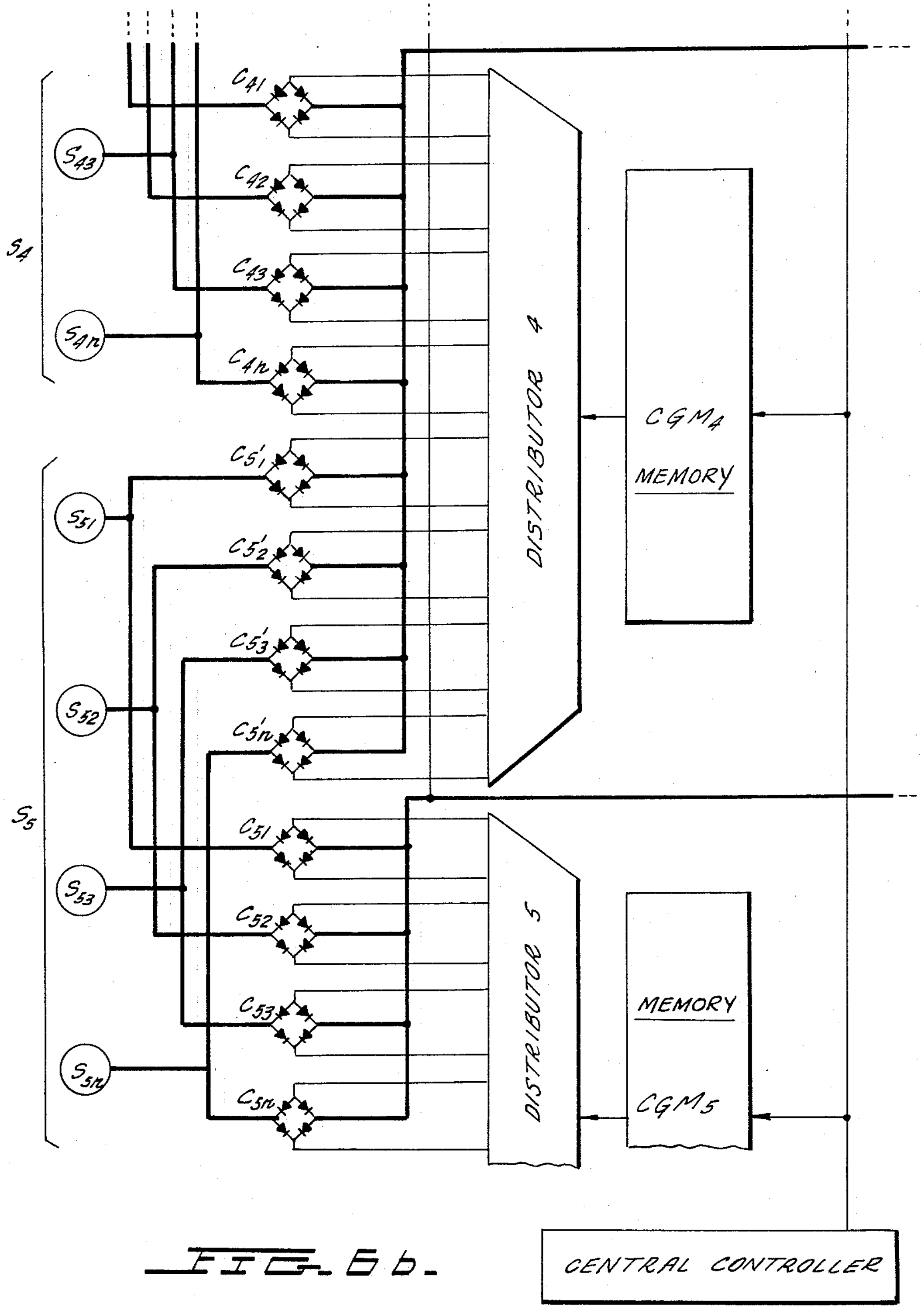

FIGURE 5 illustrates the composition of a time-division switching network in accordance with the instant invention. In the composition of the network 500, shown in FIGURE 5, it will clearly be shown through the ensuing description that no duplication of circuitry need be performed for the highways $H_1$–$H_5$ and the highway interconnections or links $L_{ij}$, thereby substantially differing from the arrangement shown in FIGURE 3, with the exception that two sets of time-division switches are provided for connecting each subscriber unit or each trunk to two highways. Thus, each $S_i$ (subscriber) group where *i* is equal to any number of 1–5, is interconnected to two different $H_i$'s (i.e., highways). That is, each $S_i$ group of the network 500 is interconnected to at least two adjacent highways, $H_i$ and $H_k$ where *k* is equal to *i* minus. If *k* is zero, it should be understood as 5. In the case where two or more $S_i$ groups should correspond to the same two $H_i$ sets, correspondence shifts with the subscript by one in a successive arrangement, then looking into the system from one such highway $H_i$, two $S_i$'s are connected thereto and in no case are the same two $S_i$'s interconnected with another highway $H_i$. That is, in no case are the two neighboring subscriber groups $S_i$ interconnected to two common highways $H_i$. If the combination correspondence is determined by transferring subscript numbers in succession in a cyclic order in such a manner that:

$S_1$ is related to $H_5$ and $H_1$; $S_2$ is related to $H_1$ and $H_2$; ... $S_5$ is related to $H_4$ and $H_5$. The above mentioned correspondence can be realized among equal numbers of subscriber groups $S_i$ and highways $H_i$ of three or more. FIGURE 6 shows this arrangement in greater detail. Now comparing FIGURES 2 or 4 with FIGURE 6, the common circuitry of a subscriber group in FIGURE 2 or 4, such as CGM and Distributor, is no longer common to a single subscriber group in FIGURE 6. The common circuitry in FIGURE 6 is shared by two neighboring subscriber groups which are connected to a highway. Therefore, the word "highway" is hereafter used in what is defined to be a novel sense. The highway is comprised of accessories such as CGM and Distributor and receives multiplexed messages which are transmitted in a time-divisional way. The operation of the cyclic memories and distributors for coupling the subscribers to their respective highways and for connecting respective highways is substantially identical to that described with respect to FIGURE 2. The major distinction between the arrangement of FIGURE 2 and FIGURES 5 and 6 is that each of the subscribers of a single subscriber group such as, for example, the subscribers $S_{11}$–$S_{1n}$ of subscriber group $S_1$, are coupled to a pair of highways $H_1$ and $H_5$. Arrangement, in its simplest form, is shown best in FIGURE 5. The detailed arrangement of the subscriber groups $S_1$, $S_2$, $S_4$ and $S_5$ is shown in FIGURES 6*a* and 6*b* with the subscriber group $S_3$ being omitted only for purposes of clarity and simplification. By controlling the cyclic memories and associated distributors for both subscriber switch connections and highway switch connections in the same manner as previously described with respect to FIGURE 2, connections between subscribers of different subscriber groups may be made. In the case where one of the two highways coupled with each subscriber group is unavailable during all time-slots *t* of the time period T, the remaining of the two highways associated with that subscriber group may be used as an alternative circuit path to provide the appropriate connection between calling and called parties. For example, considering subscriber $S_{11}$ in subscriber group $S_1$, this subscriber is coupled through the switch $C_{11}'$ (which is comprised of a diode quad) to highway $H_5$. Subscriber $S_{11}$ is also connected in common through switch $C_{11}$ (which is also comprised of a diode quad) to highway $H_1$. In order to connect subscriber $S_{11}$ to highway $H_5$ distributor$_5$, under control of cyclic memory $CGM_5$, and the central controller removes the bias from the diode quad $C_{11}'$ to establish a connection from $S_{11}$ to highway $H_5$. Simultaneously therewith the central controller operates cyclic memory $CGM_1$ and its associated Distributor$_1$ to operate diode quad $C_{11}$ to prevent a connection from $S_{11}$ to highway $H_5$. The alternative operaon may likewise be provided in order to inhibit connec- on of $S_{11}$ to highway $H_5$ and to establish connection :om $S_{11}$ to $H_1$. The alternative pairs of highways $H_2$ nd $H_3$ are available to subscriber group $S_3$ and the final ighway selected ($H_1$ or $H_5$ in the case of subscriber $S_{11}$ nd $H_2$ or $H_3$ in the case of subscriber $S_{32}$) are coupled ırough suitable cyclical memory means and distributor ıeans to connect the appropriate highways to which the ıscribers have been connected in order to complete the ɔnnection between calling and called parties. In the ɣstem 400 shown in FIGURE 4 which represents con- entional practice in time-division multiplex systems each ıbscriber group such as, for example, the subscriber roup $S_1$ is connected to a pair of highways $H_1$ and $H_1'$ nd requires a separate cyclic memory and associated dis- ibutor for each highway coupled to the subscriber group. ı the example of FIGURE 4 for five separate subscriber roups $S_1$–$S_5$ this arrangement requires ten highways $H_1$–$H_5$ and $H_1'$–$H_5'$) as compared to the system of IGURES 5, 6*a* and 6*b* which requires only five high- ays. The system of FIGURE 4 thereby requires ten ɣclic memories and associated distributor circuits for fecting all of the connections to the alternative highway :oups with a total of 45 combinations of connections etween the highways $H_1$–$H_5$ and group $H_1'$–$H_5'$. In the rangement of the instant invention shown in FIGURES ı and 6*b*, one cyclic memory and its associated dis- ibutor may be shared by two adjacent subscriber groups. or example, considering the cyclic memory $CGM_1$ and istributor$_1$ these circuits are shared by subscriber oups $S_1$ and $S_2$ since these two subscriber groups have e highway $H_1$ in common. Thus, only half the number distributors and cyclic memories are required for the ɔvel system of FIGURES 6*a* and 6*b* in order to estab- ih connections between individual subscribers within ıbscriber groups and their associated highways. The tal number of possible combinations between highways r the embodiment of FIGURES 5 and 6*a* and 6*b* is only n compared with 45 possible combinations with the sys- m 400 of FIGURE 4 which depicts conventional prac- :e. It can therefore be seen that the arrangement of e instant invention in which adjacent subscriber groups are a common highway or conversely where each sub- riber group is coupled to a pair of highways that the ntrol circuits are much fewer in number than the con- ɔl circuits required in the system of FIGURE 4. It ould be noticed that this definition will not be confused th the previous description since in the prior art system ıd the systems referred to hereinabove with reference to GURES 2 and 4 there is one-to-one correspondence be- een a subscriber group, common circuitry of a sub- riber group, and a highway. When the number of sub- riber groups $S_i$ and highway $H_i$ is two, the correspond- ce takes a degenerated form such that subscriber group is related to highways $H_1$ and $H_2$; subscriber group two related to highways $H_1$ and $H_2$ such that highways $H_1$ d $H_2$ correspond to both subscriber groups $S_1$ and $S_2$ can be seen therefrom.

FIGURE 6 shows the manner in which subscribers ı–$S_{1n}$ of subscriber group $S_1$ (for example) are con- cted to highways $H_1$ and $H_5$ in multiplex fashion rough switches $C_{11}$–$C_{1n}$ and $C_{11}'$–$C_{1n}'$ respectively.

In the case where the number of both subscriber groups and highways $H_i$ is three, or greater, the comparison the network composition 300 of FIGURE 3 and the twork composition 500 of FIGURE 5 readily reveals ɜ following advantages of the instant invention over nventional methods:

(1) With the conventional network composition 300 FIGURE 3 all units inclusive of time slot stores with ɜ exception of the individual subscriber circuits $S_{ij}$ have en duplicated in this network, whereas with the em- diment 500 of FIGURE 5 the highways $H_i$, interhigh- ıy links $L_{ij}$ and peripheral equipment are not duplicated th the result that the number of units required in the system of FIGURE 5 is relatively small according to the principles of the instant invention.

(2) The number of connection routes between two different subscriber groups $S_i$, such as, for example, between the subscriber groups $S_2$ and $S_5$ will be as follows:

In the case of FIGURE 3:

$$S_2–H_2–L_{25}–H_5–S_5$$
$$S_2–H_2'–L_{25}'–H_5'–S_5$$

In the case of FIGURE 5:

$$S_2–H_2–L_{25}–H_5–S_5$$
$$S_2–H_2–L_{24}–H_4–S_5$$
$$S_2–H_1–L_{15}–H_5–S_5$$
$$S_2–H_1–L_{14}–H_4–S_5$$

As can be seen from the above development of the existing paths between subscriber groups, the arrangements of FIGURES 3 and 5, the number of available routes according to the instant invention system, and the conventional system, are respectively, 4 and 2. Therefore, in the case of occurrence of a trouble condition in a highway, two routes still exist according to the instant invention, whereas according to the conventional system, only one route is still in operation. Thus, the present invention offers higher communication reliability. As viewed from a traffic viewpoint, a large number of routes help reduce the line blocking rate. Thus, the system designed in accordance with the principles of the instant invention has a larger call carrying capability than that of the conventional system. While the call carrying capabilities of the system 300, shown in FIGURE 3, are higher than the system of FIGURE 1 or FIGURE 5, since the product of the number of highways and the number of time slots (or the number of effective links) is twice as large as that of the system of FIGURE 1 or of FIGURE 5 as a whole, providing the network consisting of the $H_i$ group and that consisting of the $H_i'$ group are operated independently of each other and also when no trouble exists on the line. On the other hand, however, the traffic load to the full extent of the effective number of links capable of use in trouble-free condition can never be applied to the system of FIGURE 3 when the grade of service under a troubled condition is taken into account. When this is taken into consideration, together with the matters to be mentioned in the following description, the system according to the instant invention is still advantageous over the system as shown in FIGURE 3.

In the case of the system designed in accordance with the instant invention, calls that should have been carried through a route when this route is free from trouble, are carried to other routes with the result that the grade of service for the connection which should have been used for said other routes is sacrificed to a certain extent. However, considering calls using said other routes which are free from trouble calls using the disabled route and those whose calling and called subscriber groups $S_i$ are different, it can readily be transferred through a number of other trouble-free routes.

In the case of the system designed in accordance with the instant invention, the number of routes in the absence of trouble is large with the result that the deleterious effect due to abnormal traffic that cannot be passed through a trouble route or routes and flows into side routes may be dispersed and mitigated over the numerous remaining routes. In contrast, when a network consisting of highways $H_i$ ($i$ is equal to 1–5) and the network consisting of alternate highways $H_i'$ ($i$ is equal to 1–5), as shown in FIGURE 3, operate independently of one another, the influence of all trouble in highway $H_1$ becomes concentrated in the alternate highway $H_1'$ to appear as an increase in traffic resulting in a large decrease in the grade of service upon the occurrence of trouble in the line $H_1$. It should be understood that the time-slot generating facilities and their accessories for controlling the time-division contacts for that part of the highway network which has not been duplicated in this invention, should be suitably decentralized with respect to the associated highway members. Since the time-slot facilities mentioned above contain a small quantity of information data, the advantage of centralizing this data in one unit which corresponds to the entire network can be disregarded when viewed from the benefits derived in accordance with the instant invention.

Where the number of subscriber groups $S_i$ and highways $H_i$ is two, a part of the advantages of the system according to the instant invention as mentioned previously cannot be realized. The features of the invention are nevertheless still retained.

As recited previously, a comparison has been set forth between the embodiment of FIGURE 5 and the conventional system shown in FIGURE 3. As will be evident from this description, the two-stage multiplex switching system provides a system in which the duplicated part of the common circuit is optimally minimized. A decrease in the grade of service in the case of troubled condition is minimized and the condition for the link blocking rate in normal operation has been substantially improved and hence the overall call carrying capabilities have been enhanced.

Referring now to FIGURE 7, a switching network 700 is shown therein which is comprised of a plurality of subscriber groups $S_{11}$–$S_{13}$–$S_{51}$–$S_{53}$ which are directly associated with highway groups $H_{11}$–$H_{13}$–$H_{51}$–$H_{53}$, respectively. $S_{ij}$ contains a plurality of individual subscribers within the group. The highways $H_{ij}$ are electrically connected by means of the interconnecting links $H_{gij}$ wherein the interconnections between highways are represented by the circles 701–705 which surround the crossing lines at their intersections. The highway group $H_{2j}$ is interconnected to the subscriber groups $S_{1j}$ by means of the interconnecting lines 707 shown as the dot-dash lines in FIGURE 7. This pattern is repeated throughout FIGURE 7 with respect to all remaining highways and the subscriber groups and as can be noted, the interconnecting lines 706$_i$ have been repeated at both the upper and lower portions of the figure so as to represent a closed loop of such interconnecting lines wherein all such interconnecting lines 706–710 are shown in dotted fashion. For the purpose of describing the operation of the circuit of FIGURE 7, let it first be assumed that the interconnecting routes 706–710 have been removed. Then the network remaining is nothing more than the conventional multiplex switching system. Now let it be required to provide a description of a conventional multiplex switching network for the case of a time-division system.

Assuming therefore that the interconnecting routes 706–710 represented by the dot-dash lines have been removed, then 15 time-division highways $H'_{11}$, $H'_{12}$, $H'_{13}$, . . . $H'_{53}$ correspond and are connected respectively with the subscriber trunk groups $S'_{11}$, $S'_{12}$, $S'_{13}$, in the arrangement of FIGURE 7. The manner in which subscriber group $S_{32}$ is connected to highway $H_{32}$, for example, is shown in greater detail in the arrangement 800 of FIGURE 8 where the subscriber group $S_{32}$ is comprised of a plurality of individual subscribers $S_{321}$–$S_{32n}$. All of the subscribers $S_{321}$–$S_{32n}$ in subscriber group $S_{32}$ are connected to the highway $H_{32}$ by the time-division switches 801. In FIGURE 7 it should be noted that the highways having the same first subscript are grouped together such as, for example ($H_{11}$, $H_{12}$, $H_{13}$); ($H_{21}$, $H_{22}$, $H_{23}$) . . . ($H_{51}$, $H_{52}$, $H_{53}$). Each of these groups shown in parenthesis will be referred to as highway groups hereinafter in the ensuing description. In addition to the above the intergroup highways $H_{g12}$, $H_{g13}$, . . . $H_{g45}$, are provided for interconnecting the highway groups to one another. The highway groups will be identified on a group basis, as shown in FIGURE 7 by $GH_1$, $GH_2$, . . . $GH_5$. In addition to the above intragroup highways $H_{g11}$, $H_{g22}$, . . . $H_{g55}$ (not all of these have the same subscripts), are provided for connection within each highway group $GH_1$–$GH_5$, respectively, by the use of the time-division contacts 701–705, respectively.

Each intragroup highway connection is therefore represented by a circle encircling the intersection between the connecting link and the highway lines in the same manner as previously described with respect to the contact connection 701–705.

Let it now be assumed that $S_{121}$ of the subscriber group $S_{12}$ is to be connected with the subscriber $S_{312}$ of the subscriber group $S_{31}$. It should be understood that the route between the subscribers $S_{121}$ and $S_{312}$ is formed through the subscriber $S_{121}$, the contact for connecting the subscriber $S_{121}$ to highway $H_{12}$ (see, for example, the contact 801 of FIGURE 8), $H_{12}$, contact 701', $H_{g13}$, contact 703', $H_{31}$ and the contact connecting the subscriber $S_{312}$ to $H_{31}$ (see the contacts 801 of FIGURE 8) and ultimately subscriber $S_{312}$. Thus, with such a connection it is only necessary that all of the time-division switches (which control the abovementioned four contacts, respectively) contained in this route are turned "ON" simultaneously within the time interval $t$ of the time-slot $t_1$, as it is more generally called, which time interval $t$ is repeated after a predetermined time period, T. Simultaneously therewith, different connections can be established using the time slots each differing in phase from the time slot $t$ on the highways and the intergroup highway $H_{12}$, $H_{31}$, and $H_{g13}$. On each highway and each intergroup highway the same number of connections as the maximum number of time slots within the time period T can be handled at the same time. The aforementioned features of the multiplex switching system are thus realized in this manner.

The foregoing description has been for the case in which connection routes 706–710, shown by the dot-dash lines are absent from the circuit 700. The number of subscribers and/or trunks contained in each subscriber group $S_{ij}$ belonging to each highway may be on the order from 100 to 1000, for example, and are decided primarily by the number of time-slots and the amount of traffic on the highway under consideration. Upon the occurrence of a troubled condition on one highway, or within the highway accessory equipment, all of the subscribers $S_{ij}$ belonging to the effected highway therefore become inoperative. In addition thereto, it will readily be seen that a trouble on one intergroup highway effects all of the traffic on said intergroup highway or upon the intragroup highway. Such a defect presents quite a troublesome problem invariably in systems in which one function is assigned to a single piece of physical equipment. This is the reason why the provision is made of at least one standby facility (which may be operated in parallel with the operational facility at certain times, or may be operated only in the case of an emergency), so that a troubled condition in one functioning unit may not develop into a critical problem for the entire system or for an appreciably large part of the entire system.

With respect to the aforementioned intergroup highways $H_{gij}$, it has been assumed that provision be made of one intergroup highway between each two highway groups, but it may be advisable from the traffic viewpoint to provide a plurality of intergroup highways at specified times. Since this stage is a switching stage in which concentration has been effected, the number of highway group combinations is essentially reduced so that it is not difficult to provide a plurality of intergroup highways at all times. Although it has been assumed in the foregoing description that the number of routes from each individual subscriber $S_{ijk}$ is one, let a method be proposed for making the number of routes greater than one.

Among the features of the instant invention is to connect each individual subscriber $S_{ijk}$ through the appropriate time-division contact sets to a highway in a highway group which is different from the highway group :o which the individual subscriber is already connected. This is illustrated in FIGURE 7 by the provision of the lot-dash line groups 706–710 which provide the afore-nentioned connections. This is also shown in greater letail in FIGURE 8, which depicts one subscriber such as subscriber $S_{322}$, for example, which is connected to highway $H_{32}$ via one of a plurality of time-division con-acts 801, and which is further shown as being connected :o highway $H_{42}$ via one of a plurality of time-division contacts 801′. In this manner, homogeneous and cyclic connections can then be secured in the entire highway network. The advantages of this arrangement are as follows:

(1) The switching network (including the time-slot memories as well), at stages subsequent to the time-division switches for direct connection to the subscribers $S_{ijk}$ are not duplicated, resulting in a substantial decrease n the number of equipment facilities required in the remaining portion of the network.

(2) Considering the number of routes extending between subscriber $S_{121}$ and $S_{312}$; $S_{121}$-Contact 121 (not shown; corresponding to contact 801 in FIGURE 8) assigned to $S_{121}$–$H_{12}$-Contact 701′–$H_{g13}$-Contact 703′–$H_{31}$-Contact 312 (not shown; corresponding to Contact 801′ n FIGURE 8)–$S_{312}$;

$S_{121}$ - Contact 121–$H_{12}$–701″–$H_{g14}$-Contact 704′–$H_{g44}$-Line 709$_1$-Contact 312′ (not shown; corresponding to contact 801 in FIGURE 8) $S_{312}$;

$S_{121}$-Contact 121′ (not shown; corresponding to contact 801′ in FIGURE 8)-Line 707$_2$–$H_{22}$–702′–$H_{g23}$–703″–$H_{31}$-Contact 312–$S_{312}$;

$S_{121}$-Contact 121′ 707$_2$–$H_{22}$–702″–$H_{g24}$–704′–$H_{41}$–709-Contact 312′–$S_{312}$.

Thus, from the above described routes, it can be seen hat if any highway becomes faulty, at least two remain, which are free from any trouble. Viewed from a traffic tandpoint, numerous routes are definitely advantageous n reducing the link blocking rate and in enhancing the all carrying capabilities. Assuming for a moment the low of traffic in the case of trouble is constant in each highway, in such a case it is evident that the calls that hould have been carried over these routes must be carried over other routes. Thus, of calls that should have been carried over said other routes, if no trouble has occurred, that part of the calls whose originating and/or destination subscribers were different prior to the occurrence of the trouble from the ones which should have been carried over said routes, can be transferred to other trouble-free routes. In the present system, a ufficient number of trouble-free routes may be taken with the result that the abnormal traffic that cannot be assed through the trouble routes may therefore flow hrough the remaining routes and can be most proportionally distributed over the numerous routes such that he deleterious effects therefrom are substantially releved.

While the principles of the instant invention have been escribed above in connection with a specific embodiment, the description is made by way of example only nd not as a limitation to the scope of the instant invention. For example, modifications of the number of ighways and intergroup highways, or the number of ubscriber groups and/or trunk groups, or of interconections of trunk groups at each stage or stages other han the subscriber stage, this circuit's system should present no restriction to the scope of the system in accordance with the instant invention. Two modes of embodiments of the instant invention are the modes of FIGURES 5 and 7 which set forth the network of link circuit stages of two and three stages respectively. It should urther be understood that differences within the system, uch as time-division and frequency-division systems, or n the number of highways or in the number of subscriber trunk groups, or the difference in partial circuit systems, are intrinsic with the spirit of this invention and hence in no way restrict the scope of the system according to the instant invention.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. In a time-division multiplex switching network comprising a plurality of subscriber groups and a plurality of highway lines equal in number to said plurality of subscriber groups, a plurality of first multiplex switching means for connecting the subscribers of each subscriber group to a first end of their associated highways on a time sharing basis; a plurality of second multiplex switching means for interconnecting the highways of the different subscriber groups at a location removed from the first ends of said highways in accordance with the selection of a called subscriber by a calling subscriber; said second multiplex switching means being operative on a time sharing basis; means for connecting pairs of said subscriber groups to a common highway through selected ones of said first multiplex switch means wherein a different highway is connected to each pair of subscriber groups and no more than one highway is directly associated with any one pair of subscriber groups said second multiplex switching means comprising a plurality of means for selectively connecting said highways on a time-division basis; each of said plurality of means connected between no more than two of said plurality of highways.

2. In a time-division multiplex switching network comprising a plurality of subscriber groups and a plurality of highway lines associated with said groups, a plurality of first multiplex switching means for connecting the subscribers of each subscriber group to a first end of their associated highways on a time-division basis; a plurality of second multiplex switching means for interconnecting the highways of the different subscriber groups at a location removed from the first ends of said highways in accordance with the selection of a called subscriber by a calling subscriber; said second multiplex switching means being operative on a time-division basis; means for connecting pairs of said subscriber groups to a common highway through selected ones of said first multiplex switching means wherein a different highway is connected to each pair of subscriber groups and no more than one highway is directly associated with any one pair of subscriber groups said second multiplex switching means comprising a plurality of means for selectively connecting said highways on a time-division basis; each of said plurality of means connected between no more than two of said plurality of highways.

3. A time-division multiplex switching network comprising at least three subscriber groups, each of said groups including a plurality of individual subscribers; at least three highways, each of said highways being associated with no more than two of said subscriber groups; first multiplex switching means for each of said subscriber groups for connecting the subscribers of the group to a first end of their associated highway on a time-division basis; second multiplex switching means for interconnecting the highways of the network at a location removed from the first ends of said highways in accordance with the selection of a called subscriber by a calling subscriber, said second multiplex switching means being operative on a time-division basis; means for connecting pairs of said subscriber groups to a common highway through selected ones of said first multiplex switching means wherein no more than two of said subscriber groups are connected to more than one of said highways said second multiplex switching means comprising a plurality of means for selectively connecting said highways on a time-division basis; each of said plurality of means connected between no more than two of said plurality of highways.

4. In a switching network comprising a plurality of subscriber groups and a plurality of highways associated with said groups, a plurality of first multiplex switching means for connecting the subscribers of each subscriber group to a first end of their associated highways on a message sharing basis; a plurality of second multiplex switching means for interconnecting the highways of the different subscriber groups at a location removed from the first ends of said highways in accordance with the selection of a called subscriber by a calling subscriber; said second multiplex switching means being operative on a message sharing basis; means for connecting pairs of said subscriber groups to a common highway through selected ones of said first multiplex switching means wherein a different highway is connected to each pair of subscriber groups and no more than one highway is directly associated with any one pair of subscriber groups, each of said highways comprising a plurality of highway lines forming a highway line group; third multiplex switching means for interconnecting between and among the highway lines of each highway line group.

5. A time-division multiplex switching network comprising at least three subscriber groups, each of said groups including a plurality of individual subscribers; a plurality of highways equal in number to said subscriber groups, each of said highways being associated with two of said subscriber groups; first multiplex switching means for each of said subscriber groups for connecting the subscribers of the group to a first end of their associated highway on a time sharing basis; second multiplex switching means for interconnecting the highways of the network at a location removed from the first ends of said highways in accordance with the selection of a called subscriber by a calling subscriber, said second multiplex switching means being operative on a time sharing basis; means for connecting pairs of said subscriber groups to a common highway link through selected ones of said first multiplex switching means wherein no more than two of said subscriber groups are connected to each of said highways, each of said highways comprising a plurality of highway lines forming a highway line group; third multiplex switching means for interconnecting between and among the highway line of each highway line group said second multiplex switching means comprising a plurality of means for selectively connecting said highways on a time-division basis; each of said plurality of means connected between no more than two of said plurality of highways.

6. A time-division multiplex switching network comprising a plurality of subscriber groups, each of said subscriber groups including a plurality of individual subscribers; a plurality of highways, equal in number to the number of said subscriber groups; said subscriber groups being arranged in pairs; said pairs of subscriber groups being associated with a common highway wherein the first end of a different highway is connected to each pair of subscriber groups and no more than one highway is directly associated with any one pair of subscriber groups; a plurality of first multiplex switching means for connecting each of said individual subscribers to the highways associated to the subscriber group including each of said individual subscribers on a time sharing basis; a plurality of second multiplex switching means for interconnecting said highways at a location removed from the first ends of said highways on a time sharing basis; at least one of said first and said second multiplex switching means being operative in accordance with the selection of a called subscriber by a calling subscriber said second multiplex switching means comprising a plurality of means for selectively connecting said highways on a time-division basis; each of said plurality of means connected between no more than two of said plurality of highways.

No references cited.

DAVID G. REDINBAUGH, *Primary Examiner.*

J. McHUGH, *Assistant Examiner.*